United States Patent [19]
Borch et al.

[11] Patent Number: 5,801,455
[45] Date of Patent: Sep. 1, 1998

[54] APPARATUS AND METHOD FOR DISARMING AUTOMOBILE ALARM SYSTEM

[75] Inventors: Michael J. Borch, 2745 N. Mildred Ave., Chicago, Ill. 60614; Edward G. Karnig, 35 Midland Rd., East Hills, N.Y. 11577; Chau Ho Chen, Taichung, Taiwan

[73] Assignees: Edward G. Karnig; Michael J. Borch, both of Chicago, Ill.

[21] Appl. No.: 595,847

[22] Filed: Feb. 2, 1996

[51] Int. Cl.⁶ .................................. B60R 25/10
[52] U.S. Cl. ............... 307/10.3; 307/10.2; 307/10.6; 307/10.4; 180/287; 701/36; 340/425.5; 340/426
[58] Field of Search .................... 307/9.1, 10.2, 307/10.8, 140, 141, 10.3, 10.6; 340/425.5, 426, 428, 430, 825.31, 825.32, 825.34, 825.69, 825.72; 180/287; 364/424.01, 424.05

[56] References Cited

U.S. PATENT DOCUMENTS

| | | | |
|---|---|---|---|
| 3,829,829 | 8/1974 | Teich | 340/430 |
| 3,907,060 | 9/1975 | Burton et al. | 307/10.3 |
| 4,107,543 | 8/1978 | Kaplan | 307/10.3 |
| 4,209,709 | 6/1980 | Betton | 307/10.4 |
| 4,291,237 | 9/1981 | Kitano | 307/10.3 |
| 4,455,588 | 6/1984 | Mochida et al. | 307/10.4 |
| 4,842,093 | 6/1989 | Lerche et al. | 307/10.3 |
| 5,216,406 | 6/1993 | Bechtle | 307/10.2 |
| 5,287,098 | 2/1994 | Janssen | 70/237 |
| 5,309,152 | 5/1994 | Krucoff | 340/426 |
| 5,381,128 | 1/1995 | Kaplan | 180/287 |
| 5,394,135 | 2/1995 | Stadler | 180/287 |
| 5,412,370 | 5/1995 | Berman et al. | 307/10.2 |
| 5,479,156 | 12/1995 | Jones | 340/825.31 |
| 5,564,376 | 10/1996 | Labelle | 307/10.3 |
| 5,568,120 | 10/1996 | LeMense | 307/10.2 |

OTHER PUBLICATIONS

Owner'Guide, Toyota VIP RS3000 (Jun. 15, 1995).
Installation Instructions, Toyota RS3000 (Sep. 1996).

*Primary Examiner*—William M. Shoop, Jr.
*Assistant Examiner*—Peter Ganjian
*Attorney, Agent, or Firm*—Emrich & Dithmar

[57] ABSTRACT

An apparatus and method for disarming an automobile alarm system uses the ignition switch of the automobile to create a sequential pulse access code. Toward this end, two commonly available electrical circuits in the vehicle's wiring that are switched on and of by the shifting of a vehicle's ignition switch among power-applying switch positions serve to supply a pulse code of sequential electric pulses to the alarm system to perform a selected function, including entering a valet mode or overriding and disarming the system without a remote control transmitter. Because the shifting of the ignition switch generates a two-wire detectable pulse code, previously-programmed pulse codes can be selected to perform different functions in addition to disarming the system, including using pulse codes to trigger entry of the system into a learning mode.

25 Claims, 5 Drawing Sheets

APPARATUS AND METHOD FOR DISARMING AUTOMOBILE ALARM SYSTEM

BACKGROUND OF THE INVENTION

1. Field of the Invention

The present invention relates to an apparatus and method for disarming an automobile alarm system by using the ignition switch of the automobile to create a sequential pulse code generated by shifting the ignition switch to various positions.

2. Description of the Prior Art

To simplify installation, the method of turning an automotive security system ON and OFF has evolved from a simple key switch on the vehicle's fender to more sophisticated means involving electronic devices which turn themselves on automatically after turning off the ignition switch (Passive Arming,) and, more recently, radio frequency remote control transmitters which send coded radio signals to a receiver in the alarm unit installed in the vehicle.

One type of known "Passive" or automatic arming system is controlled only by the ignition key and is disarmed by entering the vehicle and then turning on the ignition switch that supplies power to a wire connected to the system to disarm it. Another type of passive arming alarm system is controlled by a remote control transmitter and is disarmed initially by the transmitter, but is designed to automatically rearm unless the ignition switch is turned on as a final step to disarm the system.

With both types of passive arming systems, a switch called a "valet" or override switch is typically installed and provides yet another means of disarming the system. The purpose of the valet switch is twofold. First, it allows putting the alarm system into a stand-by or "valet" mode when it is desired that the system should not arm itself automatically, such as when leaving the vehicle for servicing, or when leaving the vehicle with a parking valet. Second, it allows the operator to selectively override an armed system (i.e., to disarm it) as may be necessary when the transmitter control either does not work or has been lost.

The valet switch is typically mounted under the dashboard so it is out of sight but where it is easily accessible by a person sitting in the driver's seat. Hiding it in a more secure location would make installation time burdensome, as well as make it much harder to use. Normally, the switch will not perform any function unless the ignition switch keylock actuator (typically located on the steering column) is in the ON switch position. To override and disarm a system without the transmitter, one must enter the vehicle, turn the ignition switch to the ON position, and then move the valet switch to disarm the system.

A main security problem with the conventional passive alarm system is that the valet switch is only as secure as the ignition switch keylock actuator. Thieves know how the valet switch works. They either break out the ignition switch keylock actuator or break apart the side of the steering column, to access the mechanism that controls the electric ignition switch. They turn the electric ignition switch to the ON position, find the easily accessible valet switch and turn it on to disarm the system. A second security problem is that the wires from the valet switch lead directly back to the alarm control module, which is usually concealed under the dashboard, making it easy to find and disconnect the alarm system.

U.S. Pat. No. 5,381,128 to Kaplan discloses an automobile alarm system provided with an override arrangement which does not require a valet switch. The alarm system is disarmed or deactivated without a radio transmitter by turning the ignition switch from its OFF to its START (starting motor cranking) position a selected number of times. The deactivation circuitry takes advantage of the fact that in most vehicle systems, a signal pulse is produced by or available to the system which is only present when the system is armed and an attempt is made to start the vehicle. The circuitry counts these "start attempt" pulses and compares the count to a coded number chosen by the vehicle owner, i.e., the override code. If the counts match, the system will be disarmed. This scheme, however, has obvious drawbacks. The override code could be duplicated with ease by a thief, simply by turning the ignition switch on and off until the system sees the correct number of "start attempt" pulses. If optional time delay circuitry is included for further security—requiring waiting a fixed period in between pulses or after the pulses—it would be difficult for the owner to wait the proper time in such circumstances as in the dark, where one can't see a watch to wait the proper time, or in emergencies, where a person might naturally rush or miscount time.

It would be a great advancement in the field of automotive security systems to be able to provide means having a higher level of security than conventional valet switches and which means would provide an alternative way to set the alarm system into a valet mode, including selectively overriding and disarming the system.

SUMMARY OF THE INVENTION

It is a general object of the invention to provide a method and apparatus for disarming an automobile alarm system that overcome the main security problems of conventional alarm systems.

It is another object of the present invention to provide an improved method and apparatus for disarming an alarm system which eliminates the valet switch and does not require the use of a remote radio transmitter and thwarts the usual theft methods.

These and other features of the invention are attained by using two commonly available electrical circuits in the vehicle's wiring that are switched on and of by the shifting of a vehicle's ignition switch to supply a pulse code of sequential electric pulses to the alarm system to perform a selected function, including entering a valet mode or overriding and disarming the system without a remote control transmitter.

Because the shifting of the ignition switch generates a two-wire detectable pulse code, previously-programmed pulse codes can be selected to perform different functions in addition to disarming the system, including using pulse codes to trigger entry of the system into a learning mode.

The invention consists of certain novel features and a combination of parts hereinafter fully described, illustrated in the accompanying drawings, and particularly pointed out in the appended claims, it being understood that various changes in the details may be made without departing from the spirit, or sacrificing any of the advantages of the present invention.

BRIEF DESCRIPTION OF THE DRAWINGS

For the purpose of facilitating an understanding of the invention, there is illustrated in the accompanying drawings a preferred embodiment thereof, from an inspection of which, when considered in connection with the following description, the invention, its construction and operation, and many of its advantages should be readily understood and appreciated.

DETAILED DESCRIPTION OF THE PREFERRED EMBODIMENTS

Figure 1:
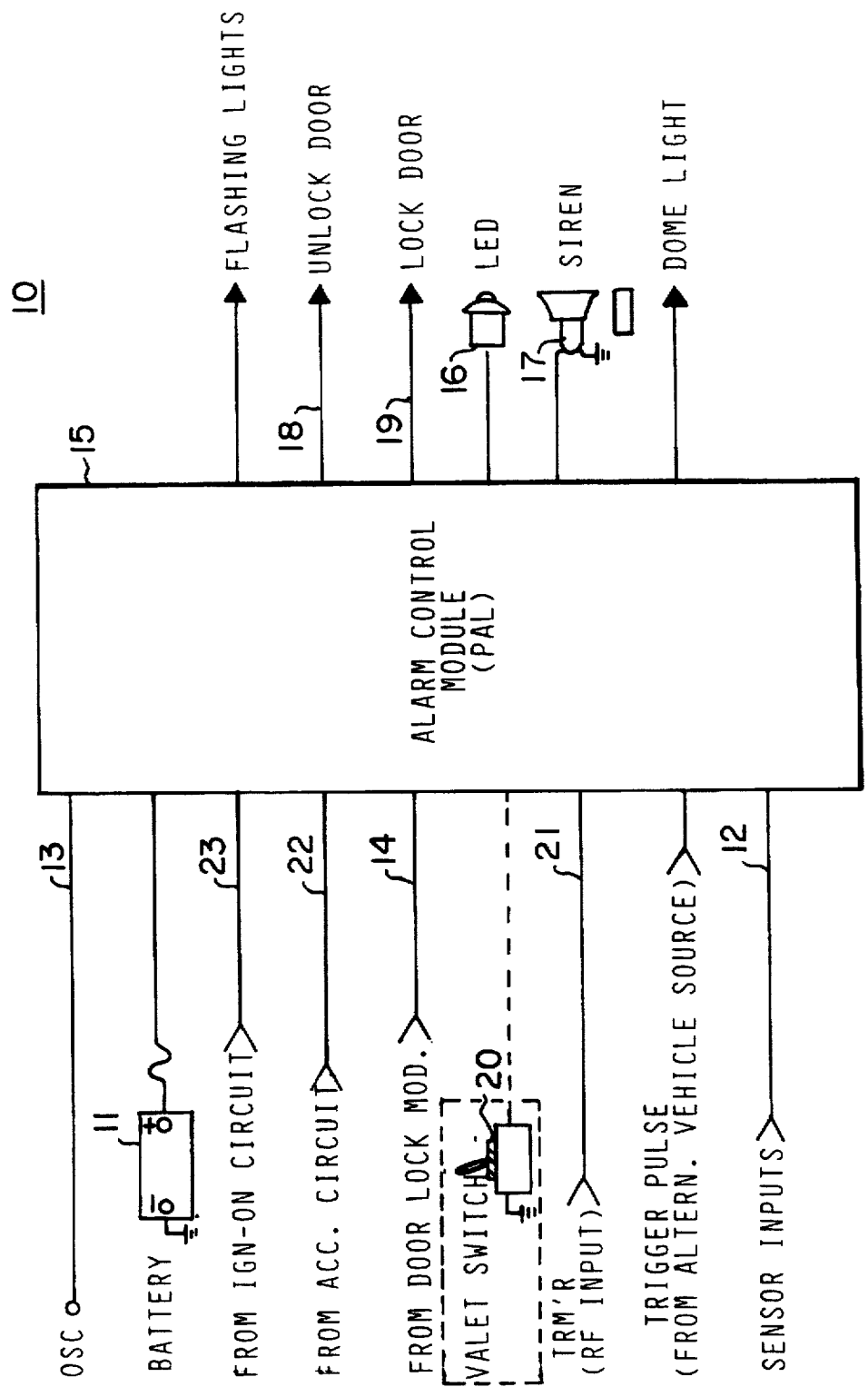
FIG. 1 is a block diagram of an alarm system constructed in accordance with the present invention.

Turning now to the drawings, and more particularly FIG. 1 thereof, there is depicted a vehicle security system 10, incorporating the features of the invention, intended for installation in a vehicle (not shown) and to draw 12-volt power from the vehicle's battery 11. The system includes an alarm module 15 which, when the system is armed, activates appropriate alert signals when an intrusion into the vehicle passenger space is detected by any of the sensors (not shown) attached to the vehicle. If the alarm system 10 is armed (LED 16 lighted) and an intrusion is detected, based on pre-programmed feature options, one or more of the following may occur to scare away the intruder, or alert a passerby: a siren 17 may sound, the vehicle's lights (parking, dome, etc) may flash, and/or the vehicle horn may sound.

The sensors may be any of a number of infra-red, ultrasonic, microwave, radio-wave or other known type of vehicle sensors, including switch-type sensors, able to detect or sense motion or other conditions and to transmit appropriate low-level electrical output signals to the alarm module 15. In the illustrative embodiment, alarm module 15 is constituted by a programmable array logic (PAL) circuit (not shown). It should be understood that the PAL circuit is designed to execute appropriate security logic routines which, in response to electrical inputs from various electrical circuits on the vehicle, operate to arm and disarm the alarm system in a unique way, and provide a programmable means for setting alarm operating features and conditions. The routines constituting the present invention are described in greater detail below in connection with FIGS. 4–7.

In addition to receiving trigger inputs from any of the available sensors via line 12, the alarm module 15 receives timing signals (OSC) from an onboard oscillating circuit (not shown) via line 13. If the system is to be used in a vehicle with power door locks, alarm module 15 may be coupled via appropriate wiring connections 18, 19 to a power door lock module (not shown) for automatically controlling those door locks. An optional external valet switch 20 may also be provided although, as is explained below, the present invention makes the valet switch unnecessary.

Additionally, the alarm module 15 may be controlled remotely by signals on line 21 from a hand-held RF coded transmitter (not shown) usually carried by the vehicle's operator. The transmitter is designed to emit one or more RF signals (RF input) for automatically arming and disarming the system in a known manner, and for allowing the operator to select or change one or more alarm operating features and/or conditions, as will be explained below.

Additionally, the alarm control module 15 is coupled to the vehicle ignition switch (not shown) which is operated by a key-lock actuator 50 or 50A (see FIGS. 2 and 3) among a normally OFF (locked) position and several power-applying positions, including accessory (ACC), ignition (ON) and start (START) positions. When the vehicle operator rotates the ignition key-lock actuator 50 or 50A to a power applying position, he moves an associated electrical mechanism (not shown) of the ignition switch to power appropriate wires to supply power to associated circuits in the vehicle.

Different circuits are turned on and off when the key-lock actuator 50 or 50A is moved to different positions. For example, when the actuator 50 or 50A is in the ACCESSORY (ACCY) position, a wire 22 (the "accessory circuit wire") is supplied with (+) $12V_{DC}$ power through the ignition switch. When the actuator 50 or 50A is in the ON position, both the accessory circuit wire 22 and a wire 23 (the "main ignition-ON circuit wire") are supplied with (+) $12V_{DC}$ power. The alarm module 15 is connected to the accessory circuit wire 22 and the ignition ON circuit wire 23, whereby by sensing the movement of the ignition switch among the various positions and by recognizing the sequence in which the ignition switch is moved back and forth as equivalent to that of a preprogrammed access code sequence, an appropriate pre-programmed action is automatically performed by the alarm system 10.

Figure 2:
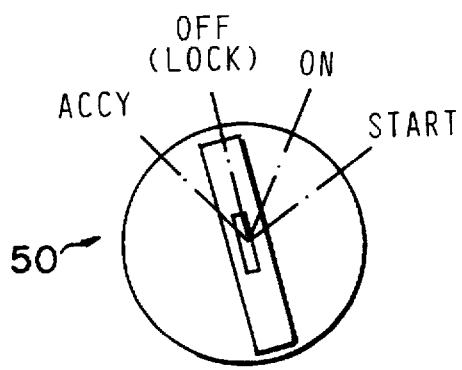
FIGS. 2 and 3 show ignition switch keylock actuator configurations for an American-type vehicle and for a foreign vehicle, respectively.

Before describing in detail the manner in which the ignition switch movement permits alarm function selection in accordance with the present invention, it should first be pointed out that there are generally two different types of ignition switches. In the typical American-made vehicle, the key-lock actuator 50, as shown in FIG. 2, starts in Lock (Off) position and turns clockwise to the "ON" position, where the ignition-ON circuit wire 23 and the accessory circuit wire 22 are both supplied with +$12V_{DC}$ power. Continuing forward to the START position turns off power to the accessory circuit wire 22 and turns on power to a vehicle starter circuit wire. The ignition-ON circuit wire 23 remains powered during movement of the actuator 50 between the ON and START positions. Rotating the actuator 50 backwards or counterclockwise from the LOCK (OFF) position sets the ignition switch in the ACCY position. In this position, +$12V_{DC}$ power is supplied only to the accessory circuit wire 22. By rotating the actuator 50 backwards and forwards, power-applying pulses are produced on the respective accessory circuit and ignition-ON circuit wires 22 and 23. These pulses constitute a sequence code which is recognized by the alarm module 15, on the basis of which a desired preprogrammed function may be performed automatically by the alarm module 15, as will be described below.

Figure 3:
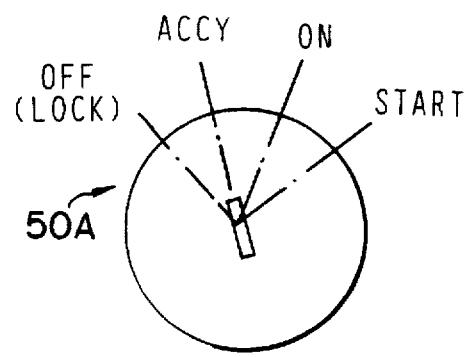

The movement pattern of the actuator 50A found in non-American or "Foreign" vehicles, and shown in FIG. 3, is slightly different than that of a actuator 50 found in the typical American-made vehicle. Foreign-vehicle actuators 50A include an initial LOCK (Off) position with the actuator only rotating forward from the LOCK position, first to the ACCY position, then to the ON position, then to the START position. This ignition switch pattern is different in that the accessory circuit wire 22 stays at (+)12V in both the ACCY and ON positions, and does not turn off or lose power between the two positions, as is the case with American-type actuators 50.

Regardless of the type of ignition switch present in the vehicle in which the alarm system 10 is to be installed, the present invention aims to take advantage of the fact that, by tapping into the accessory circuit and ignition-ON circuit wires 22 and 23, a two-wire electrical "pulse code" may be generated as the ignition switch is moved among these power-applying positions by a vehicle operator. In this regard, the alarm module 15 includes logic circuitry which allows for the different characteristics of both American and foreign-type ignition switches, while permitting unambiguous recognition of the ACCY and ON positions. The pulse code generated by the ignition switch may serve as an instruction to the alarm module 15 to perform a valet or override function—i.e., putting the alarm system 10 in a valet mode whereby the alarm system is disarmed,—thus eliminating the need for an external valet switch. The pulse code pattern may also serve as an instruction to perform other functions, such as entering into different programming modes for learning new transmitter codes and selecting feature options within the alarm system 10.

1. Entering Valet Override Mode

In the illustrative embodiment shown in FIG. 1, an external valet (toggle) switch 20 is optionally provided for controlling the valet and override functions in a conventional manner. The method of putting the alarm system 10 into the valet/override mode without using this external valet switch (or eliminating it altogether) is achieved (see FIG. 4) by the alarm module 15 sensing a two-wire sequence of power-applying pulses produced on the ignition-ON (+12V) circuit wire 23 and the accessory (+12V) circuit wire 22 as the actuator 50 or 50A is rotated among its various positions, to provide a pulse code (110) to turn valet mode ON and OFF (120), and to override the system if armed.

The main ignition-ON circuit wire 23 and the accessory circuit wire 22 both provide +12V when the ignition key is turned forward to the ON position. In an exemplary embodiment, the user wants the alarm to go into or out of valet mode or into override mode when it sees the following pre-programmed pattern of movements for an American-type actuator 50, starting with the ignition switch in the OFF position: [ACCY] [OFF] [ACCY] [OFF] [ON] [OFF] [ACCY]. The logic circuitry of the alarm module 15 will recognize the various switch positions by the following conditions produced at the ignition-ON circuit and accessory circuit wires, wherein logic 1 represents +12v and logic 0 represents 0v:

Switch position OFF=[ON 0, ACCY 0]
Switch position ACCY=[ON 0, ACCY 1]
Switch position ON=[ON 1, ACCY 1]

It will be appreciated that in foreign-type actuators 50A, the same pulse code would be obtained by the following sequence of movements starting in the OFF position: [ACCY] [OFF] [ACCY] [ON] [ACCY].

The alarm module 15 recognizes a "pulse" of the pulse code only when it sees an ON or an ACCY switch position. The OFF switch position in the sequence is not seen as a "pulse", since no power is applied to either of the wires 22 and 23. In the example above, the selected code was a four-pulse code starting in the OFF position: ACCY, ACCY, ON, ACCY. The system 10 would enter the valet-mode when it sees the last ACCY position. For security, the system 10 should accept a predetermined number of code "pulse" signals within a predetermined time period, e.g., 10 seconds, with the necessity of at least one ACCY position pulse in any code. For ease of operation, the code should have a minimum of two pulses, but for higher security the recommended minimum number is three pulses. The code could include up to about 12 pulses within the 10-second time period.

2. Entering Learning Mode

Figure 7:
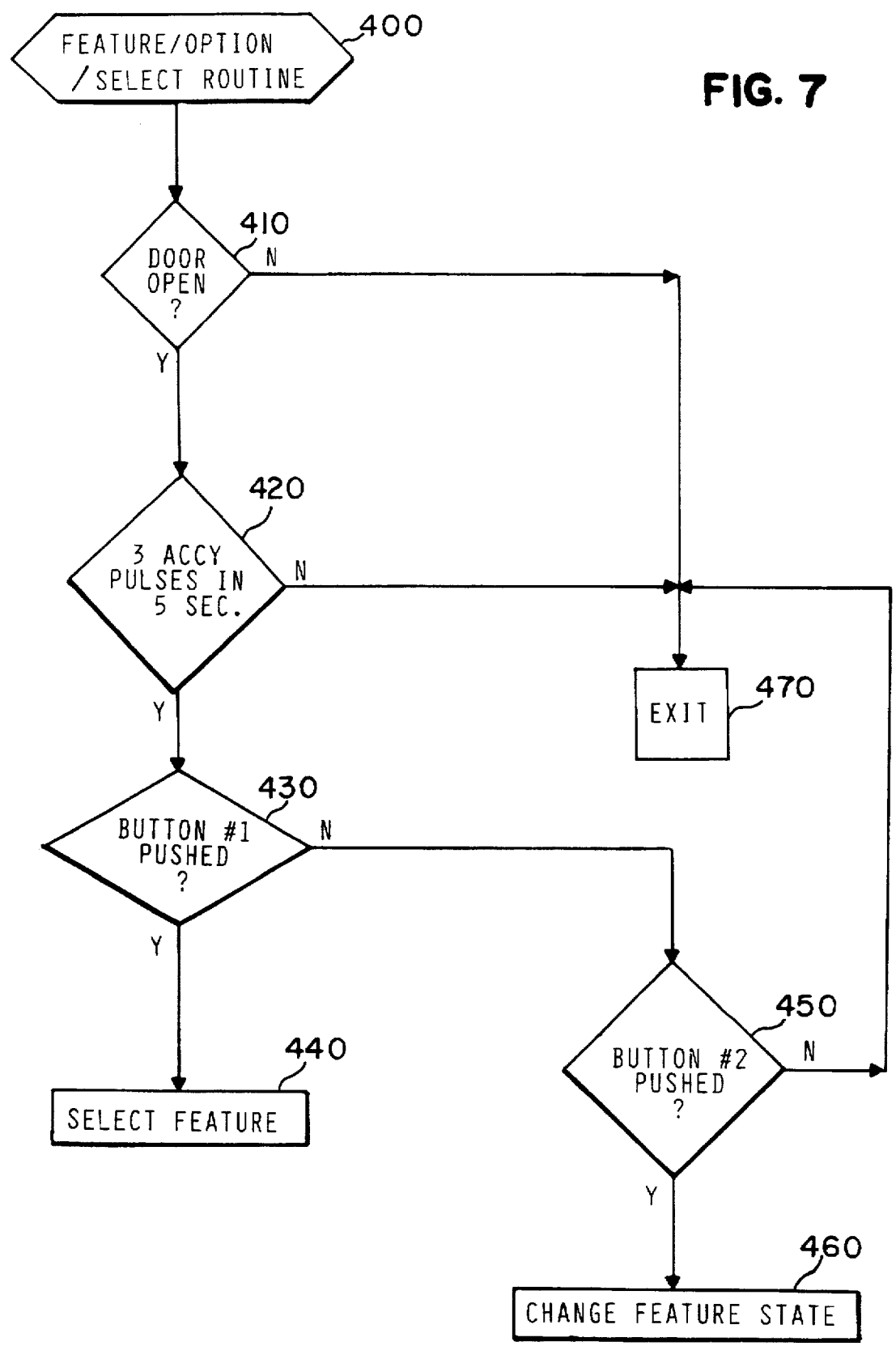
FIG. 7 is a flowchart of a feature/option learn routine.

As indicated above, the pulse code concept can be extended further to generate a pulse code pattern recognizable by the alarm module 15 to perform other functions, such as entering into a learning mode where, in the preferred embodiment, one of three actions may be taken, including (1) programming the alarm system 10 to accept RF signals from a new RF control transmitter (FIG. 5), (2) programming the system 10 to accept a new pulse code for entering into the valet or override mode (FIG. 6), and (3) programming the system 10 to select different feature options (FIG. 7).

Figure 4:
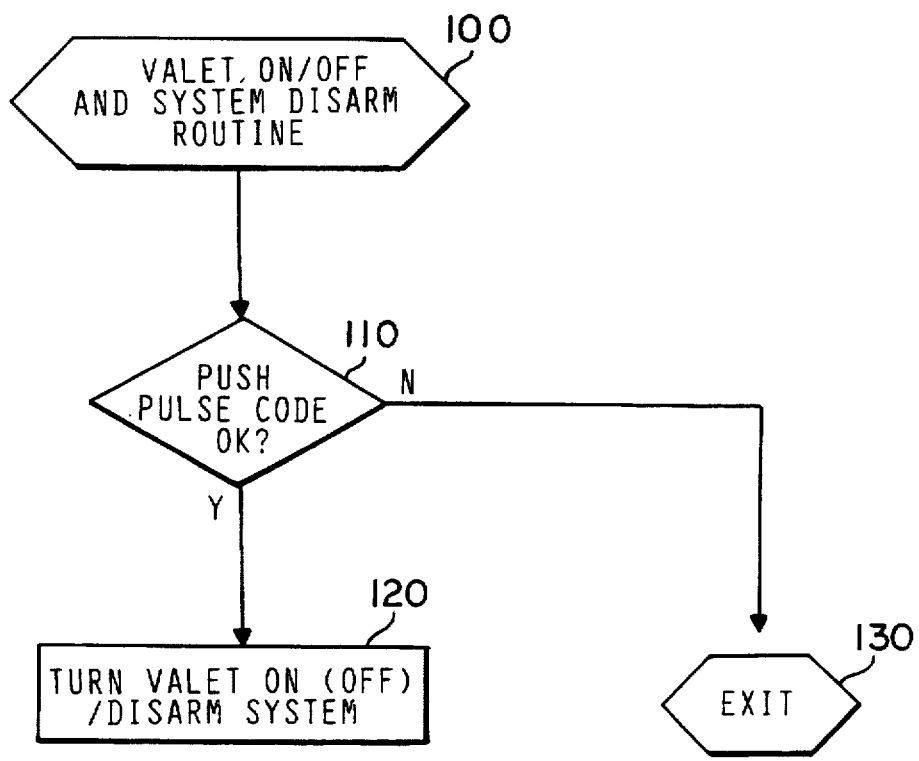
FIG. 4 is a flowchart showing the steps for entering a valet mode by the alarm system's recognition of a pulse code entered by shifting of the ignition switch among its various positions.
Figure 5:
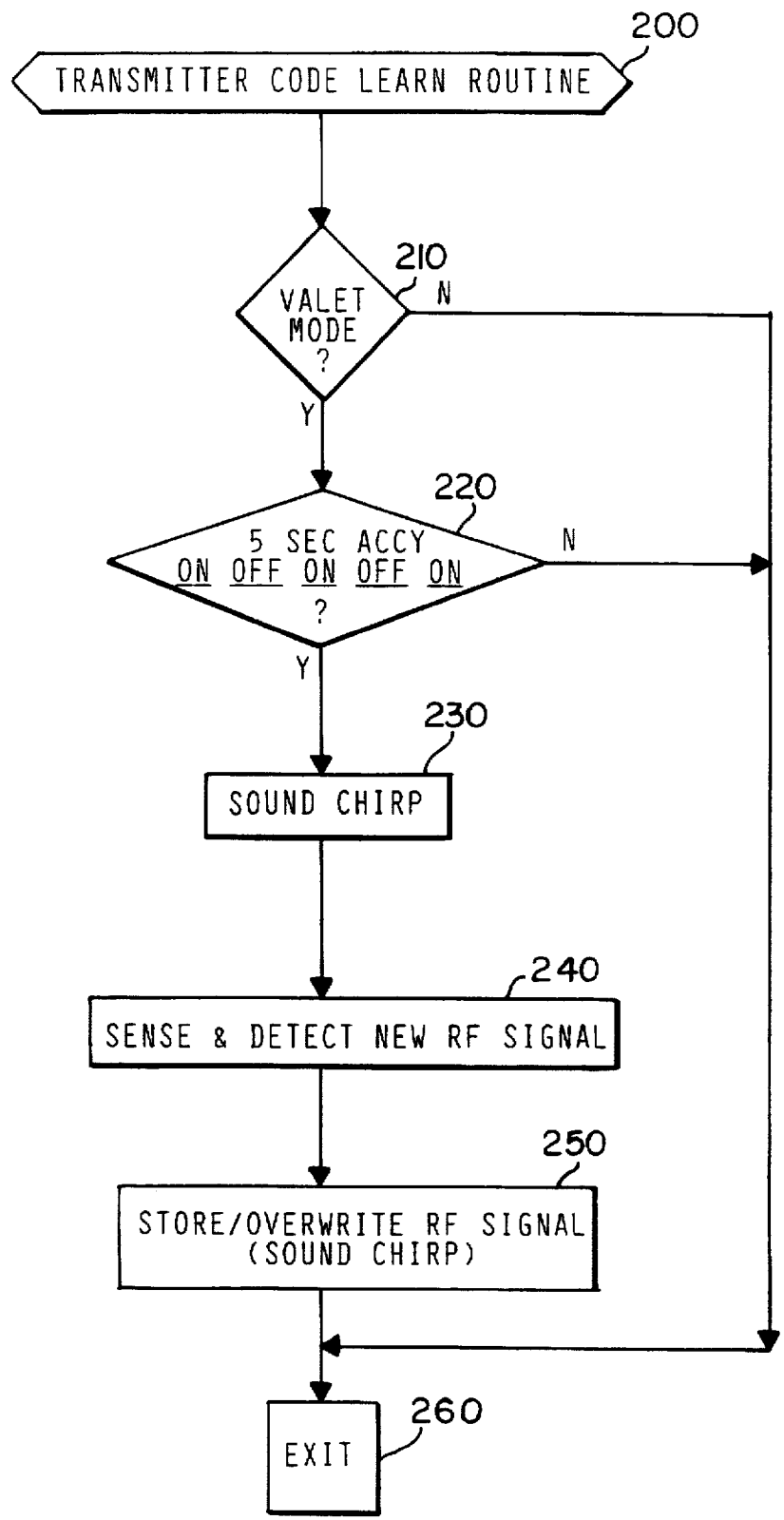
FIG. 5 is a flowchart of a transmitter learn routine.
Figure 6:
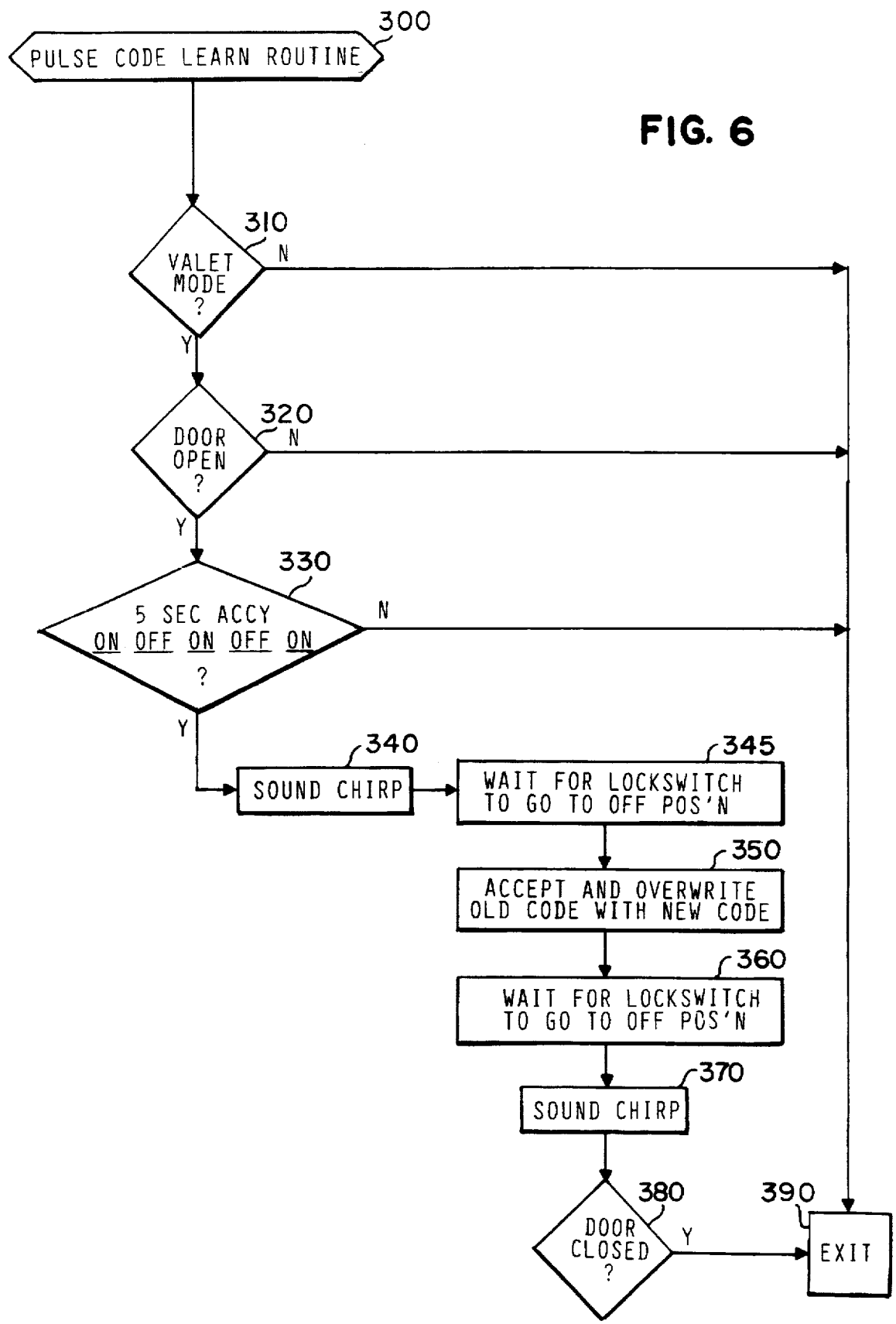
FIG. 6 is a flowchart of a pulse code learn routine.

A. To Enter Transmitter Code Learning (200) (FIG. 5):

1. Put system into valet mode (210) using transmitter, external valet switch if available, or enter valet-entering pulse code pattern (FIG. 4)

2. Within 5 seconds after putting into valet mode, starting with the ignition switch in the OFF position, turn ignition switch to the following positions: ACCY, OFF, ACCY, OFF, ACCY, and leave in ACCY position (220).

3. One long Siren Chirp will signal ready to accept RF signal of a multi-channel transmitter (230). The receipt of an RF signal would be confirmed by one long Siren Chirp, and the learn routine would accept the new RF signal as another transmitter to operate this system (240, 250). In the constructional embodiment, there is program capacity for four separate transmitters. Learning a fifth transmitter's RF signal would eliminate the first learned transmitter's RF signal from memory. Entering the first channel of a transmitter is sufficient for the alarm to respond to all the channels of the transmitter.

B. To Enter ON/ACCY Pulse Code Learn Routine (300) (FIG. 6):

1. Put system into valet mode (310) using transmitter, external valet switch if available, or enter valet-entering pulse code pattern (FIG. 4)

2. Open door and leave open (320).

3. Within 5 seconds after putting into valet mode and/or opening door, turn ignition switch to the following positions: ACCY, OFF, ACCY, OFF, ACCY, and leave in ACCY position (330).

4. One long and one short siren chirp will indicate ready to accept new pulse code sequence for the next fifteen seconds, starting and ending with the ignition switch in the OFF position (340).

5. Turn the ignition switch to the OFF position, then enter the chosen new pulse code, ending with the ignition switch in the OFF position (350, 360). The system will recognize the last power-applying pulse during the 15-second period as the last pulse of the code, after which the system will accept the new pulse code and overwrite the old pulse code with the new pulse code. The siren will give 2 sets of one long and one short chirp to indicate the code is accepted (370).

6. Close door to exit routine (380, 390).

If the fifteen seconds elapses while the pulse code is still being entered, the siren will sound two long and then two short pulses, and the operator must start sequence again by closing the door, and then re-performing steps 2–6.

When programming a new pulse code, the system should see that the new pulse code must start with the ignition switch in the OFF position, and should note the last code pulse before the ignition switch goes back to OFF during the 15-second period as the pulse after which the system will enter either the valet or override mode, depending on whether the system is Armed or disarmed.

C. To Enter Feature/Operation Select Routine (400) (FIG. 7):

1. Do NOT put system into Valet.
2. Open door and leave open (410).
3. Within 5 seconds after opening the door, turn ignition switch to ACCY, OFF, ACCY, OFF, ACCY, and leave in ACCY position (420).
4. One long and two short siren chirps will indicate ready to accept new settings for the Feature/Operation ON/Off chart below.

Pressing RF Transmitter Button #1 will select which feature is to be changed (430, 440). Short siren chirps will indicate the feature number selected.

After the feature number is selected, pressing Transmitter Button #2 (450, 460) will select one of two operating conditions of that feature.

One chirp will indicate one condition and two chirps will indicate the other condition, in accordance with the following table of selectable features:

| Number | Feature | 1 Chirp = | 2 Chirp = | Preset |
|---|---|---|---|---|
| 1 | .8 or 3.5 sec. door lock pulse | .8 sec. | 3.5 sec. | .8 sec. |
| 2 | When in manual arming mode automatic rearm system if disarmed by transmitter, then no door open within 30 seconds. | ON | OFF | ON |
| 3 | No auto door unlock pulse when turning ignition switch off. | ON | OFF | OFF |
| 4 | No auto door lock pulse if door is open when turn on Ignition. | ON | OFF | OFF |
| 5 | 2 Door unlock pulses 1 sec. apart. | 1 pulse | 2 pulses | One |
| 6 | Code hopping RF circuit | ON | OFF | ON |

To exit the Feature/Option Select Routine, turn the ignition switch to the OFF position. Two sets of one long and two short siren chirps will signal exit of routine. If no RF code is input within 10 seconds after entering this learn routine, or after selecting a feature number by pressing transmitter button #1, the system will automatically end the routine, retaining whatever settings were entered.

By analyzing and developing a means of using different powered electrical circuits from the vehicle's own ignition switch to create an electrical "pulse code" that is programmed into a security system to be accepted to perform various functions, we have eliminated the need for valet and/or override/disarm switches that are uniformly installed with an automotive security system. This accomplishes the following goals to achieve a higher level of security than that provided by present security systems:

1. thwarts several of the usual methods used to defeat security system;
2. eliminates the telltale wiring from the valet or override switch that leads to the security system alarm module 15, which makes locating that module much more difficult for the thief; and
3. provides for simple, faster more secure installation of the security system.

By tapping into the ignition-ON and accessory wires as inputs to provide a programmable coded signal to the alarm system 10, the act of overriding/disarming the alarm or entering valet mode can be performed without installing a valet switch, thus eliminating the usual means of defeating the system and the telltale wires that lead from the valet switch back to the control module.

It should be appreciated that by programming the alarm system 10 to learn and accept one of many various combinations of (+)12 volt pulses from the ignition switch "ACCY" and "ON" positions within a given time limit to enter the override or valet mode, a higher level of security can be achieved.

Furthermore, it should be appreciated that since the present invention is based on the idea of using a two-wire (ON-ACCY) generated pulse code to select/reprogram alarm functions, a much higher level of security is provided than would be the case with a one-wire pulse code technique. Of course, more than two wires can also be used to further improve security. This may involve coupling the alarm module 15 to yet another trigger-pulse generating circuit. For example, in addition to moving the ignition switch to put the vehicle in valet mode, the operator may also be required to strike the power-door lock button, or hit the power-seat button, or turn-on the parking lights, or the brake lights or the dome light. The extra step(s) can be done during the shifting of the ignition switch or any time before or after. With two or more wires (pulse generating inputs) being used, the complexity of the pattern of the security code is greatly increased, thereby making it much more difficult to duplicate deliberately or accidentally.

It is also notable that the system does not use a pattern of long and short pulses on one wire, because of the difficulty of successfully duplicating the timing of such a pattern by the user, and the low number of combinations that kind of coding would provide.

While particular embodiments of the present invention have been shown, and described, it will be obvious to those skilled in the art that changes and modifications may be made without departing from the invention in its broader aspects. Therefore, the aim in the appended claims is to cover all such changes and modifications as fall within the true spirit and scope of the invention. The matter set forth in the foregoing description and accompanying drawings is offered by way of illustration only and not as a limitation. The actual scope of the invention is intended to be defined in the following claims when viewed in their proper perspective based on the prior art.

We claim:

1. A method for disarming an alarm system having a programmed override code for a vehicle of the type having power-applying switches for respectively applying power to power wires, including an ignition switch which is movable among plural power-applying switch positions, each of which positions applies power to a different arrangement of one or more power wires, the method comprising the steps of:

generating a sequential pulse code responsive to the shifting of one or more of the power applying switches for selectively applying power to at least two different power wires;

monitoring the at least two different power wires to detect the sequential pulse code; and disarming the alarm system when said pulse code is the same as the programmed override code.

2. The method of claim 1, wherein said power-applying switch positions include an ignition position and an accessory position.

3. The method of claim 2, wherein the pulse code is generated only in response to presence of said ignition switch in its ignition and accessory switch positions.

4. The method of claim 1, wherein said step of disarming the alarm system includes the step of determining whether the pulse code is generated within a maximum time period.

5. The method of claim 4, wherein said maximum time period is ten seconds.

6. A method for changing operating features of an operator-programmable alarm system having a learning mode and a programmed learning-mode access code for a vehicle of the type having power-applying switches for respectively applying power to power wires including an ignition switch which is movable among plural power-applying switch positions, each of which positions applies power to a different arrangement of one or more power wires, the method comprising the steps of generating a pulse code responsive to the shifting of one or more of the power applying switches for respectively applying power to at least two different power wires;

monitoring the at least two different power wires to detect the sequential pulse code; and activating the learning mode to change the operating features of the alarm system when the pulse code is the same as the programmed learning-mode access code.

7. The method of claim 6, wherein said step of activating the learning mode includes the steps of:

selecting a learn routine to be entered; and entering the selected learn routine.

8. The method of claim 7, and further comprising, in response to entering the selected learn routine, the steps of:

prompting an operator to transmit an RF signal from a remote control transmitter; and capturing the RF signal and storing it to enable remote operation of the alarm system by transmission of the captured RF signal upon exiting of the selected learn routine.

9. The method of claim 8, further comprising an initial step of putting the vehicle in a valet mode wherein the alarm system is disarmed.

10. The method of claim 9, wherein the step of putting the vehicle in the valet mode includes using one of an RF transmitter and a valet switch.

11. The method of claim 9, wherein the step of putting the vehicle in the valet mode includes the steps of generating a valet-setting access code responsive to the shifting of at least the ignition switch, in a known sequence, among its plural power-applying switch positions.

12. The method of claim 7, further comprising an initial step of putting the vehicle in a valet mode wherein the alarm system is disarmed.

13. The method of claim 12, wherein the step of putting the vehicle in the valet mode includes using one of an RF transmitter and a valet switch.

14. The method of claim 12, wherein the step of putting the vehicle in the valet mode includes the steps of generating a valet-setting access code responsive to the shifting of at least the ignition switch, in a known sequence, among its plural power-applying switch positions.

15. The method of claim 14, and further comprising, in response to entering the selected learn routine, the steps of:

prompting an operator to generate a new valet-setting access code by the operation of shifting the ignition switch among its plural power-applying switch positions in a sequence different from the known sequence; and replacing the valet-setting access code with the new access code upon exiting of the selected learn routine.

16. The method of claim 15, wherein the step of selecting a learn routine to be entered includes the step of detecting a vehicle door-open condition, and wherein the exiting of the selected learn routine occurs in response to the detection of a vehicle door-close condition.

17. The method of claim 15, further comprising the step of aborting the selected learn routine if not exited within a predetermined time period.

18. The method of claim 6, further comprising, in response to activating the learning mode, the steps of:

prompting an operator to transmit one or more RF signals from a remote control transmitter; and selecting an operating feature of the alarm system on the basis of said one or more RF signals.

19. The method of claim 18, further comprising the steps of prompting the operator that an operating feature has been selected, and selecting a condition of the operating feature on the basis of one or more additional RF signals.

20. The method of claim 18, further comprising the step of terminating the learn routine by shifting the ignition switch to a predetermined position.

21. An alarm system having a programmed function-specific access code for a vehicle of the type having on-board electric switches including plural power-applying switch wires, the system comprising:

a control circuit operating under program control coupled to at least two of the power applying switch wires and responsive to actuation of the switches for generating on the at least two of the power-applying switch wires a sequence of power-applying pulses representative of a pulse code;

said control circuit being responsive to the pulse code for generating alarm signals when the pulse code is the same as the programmed access code; and an alarm device coupled to said control circuit and responsive to said alarm signals for performing a selected alarm function.

22. The alarm system of claim 21, wherein the selected alarm function is the disarming of the alarm system.

23. The alarm system of claim 21, wherein the selected alarm function is the entering of a programming mode to change an operating features of the alarm system.

24. The alarm system of claim 21, wherein the switches include an ignition switch having plural power-applying wires and movable among plural power-applying switch positions, said pulse code being generated by actuation of said ignition switch among its plural power-applying switch positions.

25. The alarm system of claim 24, wherein said ignition switch includes an ignition switch position and an accessory switch position and said pulse code is generated only in response to presence of said ignition switch in its ignition and accessory switch positions.

* * * * *

UNITED STATES PATENT AND TRADEMARK OFFICE
CERTIFICATE OF CORRECTION

PATENT NO. : 5,801,455
DATED : September 1, 1998
INVENTOR(S) : Michael J. Borch et al.

It is certified that error appears in the above-identified patent and that said Letters Patent is hereby corrected as shown below:

Column 9, line 32, "RP" should be --RF--.

Column 10, line 17, "RP" should be --RF--.

Signed and Sealed this

Twelfth Day of January, 1999

Attest:

Attesting Officer

*Acting Commissioner of Patents and Trademarks*